US008758611B2

(12) United States Patent
Beppu et al.

(10) Patent No.: US 8,758,611 B2
(45) Date of Patent: Jun. 24, 2014

(54) EDGE MEMBER FOR MEMBRANE ELEMENT AND MEMBRANE ELEMENT EQUIPPED WITH SAME

(75) Inventors: Masashi Beppu, Ibaraki (JP); Toshimitsu Hamada, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 279 days.

(21) Appl. No.: 13/202,644

(22) PCT Filed: Feb. 22, 2010

(86) PCT No.: PCT/JP2010/052646
§ 371 (c)(1),
(2), (4) Date: Aug. 22, 2011

(87) PCT Pub. No.: WO2010/095739
PCT Pub. Date: Aug. 26, 2010

(65) Prior Publication Data
US 2012/0037562 A1 Feb. 16, 2012

(30) Foreign Application Priority Data
Feb. 23, 2009 (JP) ................. 2009-039722

(51) Int. Cl.
*B01D 63/10* (2006.01)
*B01D 65/00* (2006.01)

(52) U.S. Cl.
USPC .............. 210/321.83; 210/321.74; 210/494.1

(58) Field of Classification Search
USPC ............ 210/321.6, 321.74, 321.83, 450, 451, 210/455, 476, 477, 493.4, 494.1
See application file for complete search history.

(56) References Cited

U.S. PATENT DOCUMENTS

| 5,108,604 A | 4/1992 | Robbins |
| 5,128,037 A | 7/1992 | Pearl |

(Continued)

FOREIGN PATENT DOCUMENTS

| CN | 1538871 | 10/2004 |
| CN | 1539548 | 10/2004 |

(Continued)

OTHER PUBLICATIONS

English translation of the international preliminary report on patentability (Chapter 1) issued by the International Bureau of WIPO on Sep. 13, 2011 in the corresponding PCT patent application No. PCT/JP2010/052646.

(Continued)

*Primary Examiner* — John Kim
(74) *Attorney, Agent, or Firm* — Knobbe, Martens, Olson & Bear LLP

(57) ABSTRACT

Disclosed are an edge member for membrane elements that can effectively improve adhesion with exterior finishing materials, and a membrane element that is equipped with the same. A plurality of types of undulations (134, 135) of different shapes are formed on the circumference of an extension (132) that extends from the main body (131) of an anti-telescoping member (edge member for membrane element) (13) toward a membrane roll body (11), and an exterior finishing material is attached to extend across the circumference of the extension (132) and the circumference of the membrane roll body. The adhesion between the anti-telescoping member (13) and the exterior finishing material can thus be effectively improved, since the exterior finishing material can be attached to the circumference of the extension (132) with the plurality of types of undulations (134, 135) in contact with the exterior finishing material.

14 Claims, 12 Drawing Sheets

(56) References Cited

U.S. PATENT DOCUMENTS

| | | |
|---|---|---|
| 6,224,767 B1 | 5/2001 | Fujiwara et al. |
| 7,172,697 B2 * | 2/2007 | Chikura et al. .......... 210/321.83 |
| 2003/0019843 A1 | 1/2003 | Kawai et al. |
| 2003/0024868 A1 | 2/2003 | Hallan |
| 2004/0195164 A1 | 10/2004 | Hirokawa et al. |
| 2005/0057002 A1 | 3/2005 | Chikura et al. |
| 2005/0077229 A1 | 4/2005 | Ishii |
| 2006/0049093 A1 | 3/2006 | Chikura et al. |
| 2007/0017860 A1 | 1/2007 | Chikura et al. |
| 2008/0110292 A1 | 5/2008 | Ohira et al. |
| 2009/0095670 A1 | 4/2009 | Uda et al. |
| 2009/0188855 A1 | 7/2009 | Chikura et al. |
| 2009/0277825 A1 | 11/2009 | Beppu et al. |

FOREIGN PATENT DOCUMENTS

| | | |
|---|---|---|
| CN | 1676203 | 10/2005 |
| JP | 04-330921 A | 11/1992 |
| JP | 11-207156 A | 8/1999 |
| JP | 2000-015063 | 1/2000 |
| JP | 2003-171190 A | 6/2003 |
| JP | 2004-190096 A | 7/2004 |
| JP | 2004-275822 | 10/2004 |
| JP | 2005-111473 A | 4/2005 |
| JP | 2007-289830 A | 11/2007 |
| JP | 2008-120163 A | 5/2008 |
| KR | 10-2008-0070864 | 7/2008 |

OTHER PUBLICATIONS

Notice of Preliminary Rejection dated Nov. 26, 2012 in corresponding Korean patent application No. 10-2011-7022037.
Notice of Allowance dated Jul. 31, 2013 in corresponding Korean patent application No. 10-2011-7022037.
First Office Action dated Jun. 25, 2013 in corresponding Chinese patent application No. 201080009007.X.
Notification of Reasons for Refusal dated Aug. 6, 2013 in corresponding Japanese patent application No. 2009-039722.
Second Office Action dated Feb. 18, 2014 in corresponding Chinese patent application No. 201080009007.X.

* cited by examiner

Fig. 5
(a)
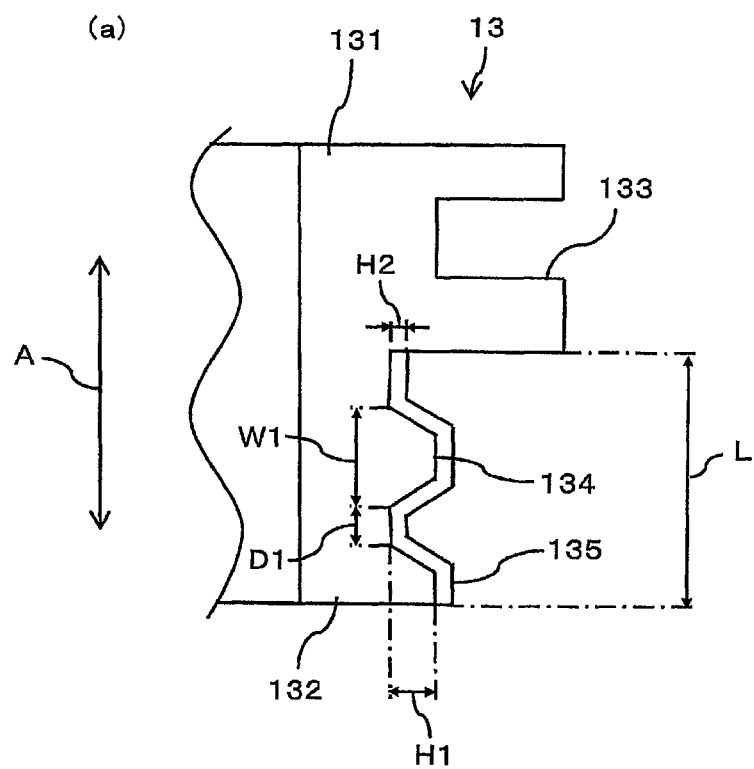
(b)
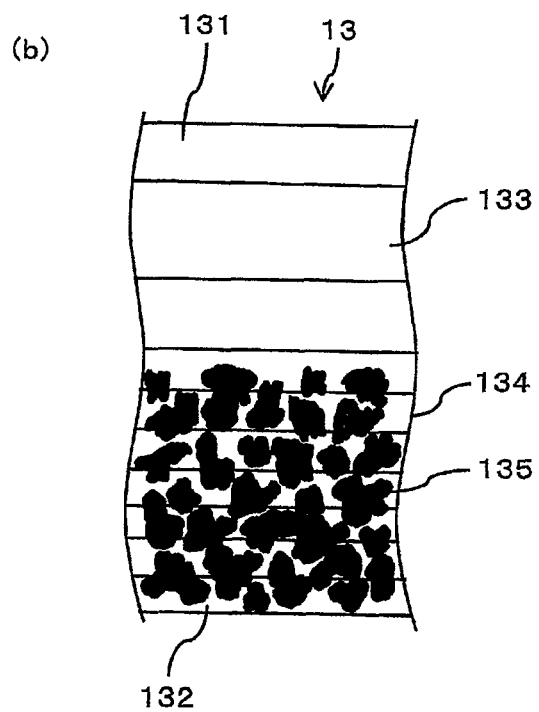

Fig. 7A
(a)
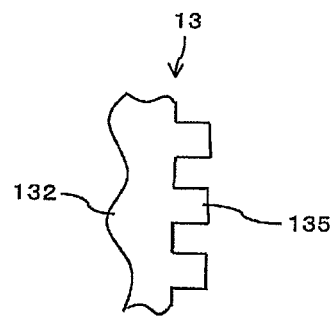
(b)
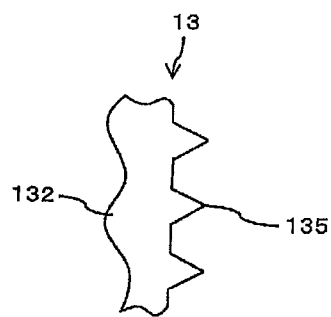

EDGE MEMBER FOR MEMBRANE ELEMENT AND MEMBRANE ELEMENT EQUIPPED WITH SAME

This application is the U.S. National Phase under 35 U.S.C. §371 of International Application No. PCT/JP2010/052646, filed Feb. 22, 2010, which claims priority to Japanese Patent Application No. 2009-039722, filed Feb. 23, 2009. The International Application was not published in English under PCT Article 21(2).

TECHNICAL FIELD

The present invention relates to an edge member for membrane elements that is disposed at an end in an axial line direction of a membrane roll body formed by winding a membrane member around and serves to prevent the membrane member from being shifted along the axial line direction, as well as to a membrane element equipped with the same.

BACKGROUND ART

As one example of a membrane filtration apparatus that produces a permeated liquid by filtering a raw liquid with use of a membrane element, there is known a membrane filtration apparatus equipped with a membrane element having a membrane roll body formed by winding a membrane member around and a pressure-resistant vessel for housing the membrane element. The pressure-resistant vessel is made, for example, of a tubular shape. Typically, within the pressure-resistant vessel, a plurality of membrane elements are disposed side by side in a straight line along the axial line direction thereof.

The membrane roll body in a membrane filtration apparatus of this type is formed by winding a membrane member around. This may result in a case in which, by a pressure along the axial line direction that is received from the raw liquid or the like flowing through the pressure-resistant vessel, the membrane member may be shifted along the axial line direction, whereby the membrane roll body may be deformed in a telescopic shape. In order to cope with such a problem, there is known a technique such that the shift of the membrane member along the axial line direction is prevented by attaching an edge member (a so-called anti-telescoping member) to face an end surface of the membrane roll body (see, for example, Patent Documents 1 to 3 listed below).

As disclosed in Patent Documents 1 to 3, an exterior finishing material is provided on an outer circumference of the membrane element, and the exterior finishing material is attached to extend across an outer circumference of the membrane roll body and a part of the anti-telescoping member.

PRIOR ART DOCUMENTS

Patent Documents

Patent Document 1: Japanese Unexamined Patent Publication No. 2005-111473
Patent Document 2: Japanese Unexamined Patent Publication No. 2007-289830
Patent Document 3: Japanese Unexamined Patent Publication No. H11-207156

SUMMARY OF THE INVENTION

Problems to be Solved by the Invention

From the viewpoint of improving filtration performance of a membrane element, an area of the membrane member within the membrane element is preferably as large as possible. Therefore, in Patent Document 1, a structure is proposed in which a diameter of the membrane roll body can be increased by omitting the parts (skirt) of the anti-telescoping member that face the outer circumference of the membrane roll body.

However, when a structure as described above is adopted, a contact area between the exterior finishing material provided on the outer circumference of the membrane element and the anti-telescoping member becomes narrow, whereby an adhesion strength between the exterior finishing material and the anti-telescoping member decreases. When the adhesion strength between the exterior finishing material and the anti-telescoping member decreases in such a manner, a raw liquid will leak out to the outside of the exterior finishing material via the contact part having a weak adhesion strength, whereby the amount of the raw liquid flowing through the membrane element decreases. The raw liquid has a function of restraining a concentration polarization on the membrane surface. Therefore, when the amount of the raw liquid decreases as described above, there is a fear such that the performance of the membrane element may not be fully exhibited.

The present invention has been made in view of the above circumstances, and an object thereof is to provide an edge member for membrane elements that can effectively improve the adhesion strength to the exterior finishing material, as well as a membrane element equipped with the same.

Means for Solving the Problems

An edge member for membrane elements according to the present invention is an edge member for membrane elements that is disposed at an end in an axial line direction of a membrane roll body formed by winding a membrane member around and serves to prevent the membrane member from being shifted along the axial line direction, including a main body that faces an end surface of the membrane roll body; and an extension that extends from the main body toward the membrane roll body along the axial line direction, characterized in that a plurality of types of undulations having different shapes from each other are formed on an outer circumference of the extension, and an exterior finishing material is attached to extend across the outer circumference of the extension and an outer circumference of the membrane roll body.

According to such a structure, a plurality of types of undulations having different shapes from each other are formed on the outer circumference of the extension that extends from the main body of the edge member for membrane elements toward the membrane roll body, and the exterior finishing material is attached to extend across the outer circumference of this extension and the outer circumference of the membrane roll body. Accordingly, the exterior finishing material can be attached to the outer circumference of the extension in a state in which the exterior finishing material is in contact with the plurality of types of undulations, whereby the adhesion strength between the edge member for membrane elements and the exterior finishing material can be effectively improved.

The plurality of types of undulations may have a structure in which, on a protrusion of the undulation of a certain type, a protrusion of the undulation of a different type is formed, a structure in which, on a recess of the undulation of a certain type, a protrusion of the undulation of a different type is formed, or a structure in which, on a recess and on a protrusion of the undulation of a certain type, a protrusion of the undulation of a different type is formed.

Also, a structure may be such that a gasket is held on the outer circumference of the main body.

The edge member for membrane elements according to the present invention is characterized in that the plurality of types of undulations are different from each other in at least one of a height difference and a width along the axial line direction.

According to such a structure, the exterior finishing material can be attached to the outer circumference of the extension in a state in which a plurality of types of undulations that are different from each other in at least one of the height difference and the width along the axial line direction are formed on the outer circumference of the extension, and the exterior finishing material is in contact with these undulations. In this manner, by allowing at least one of the height difference and the width along the axial line direction to be different, the adhesion strength between the edge member for membrane elements and the exterior finishing material can be more effectively improved.

The edge member for membrane elements according to the present invention is characterized in that the plurality of types of undulations include a first undulation having a constant width along the axial line direction and a second undulation having a width smaller than the constant width along the axial line direction.

According to such a structure, the exterior finishing material can be attached to the outer circumference of the extension in a state in which the first undulation and the second undulation that are different from each other in the width along the axial line direction are formed on the outer circumference of the extension, and the exterior finishing material is in contact with these undulations. In this manner, by allowing the width along the axial line direction to be different, the adhesion strength between the edge member for membrane elements and the exterior finishing material can be more effectively improved.

The edge member for membrane elements according to the present invention is characterized in that the plurality of types of undulations include a first undulation having a constant width along the axial line direction and a second undulation made of a predetermined pattern that is not formed to have a constant width along the axial line direction.

According to such a structure, the exterior finishing material can be attached to the outer circumference of the extension in a state in which the first undulation having a constant width along the axial line direction and the second undulation made of a predetermined pattern that is not formed to have a constant width along the axial line direction are formed on the outer circumference of the extension, and the exterior finishing material is in contact with these undulations. In this manner, by providing an undulation having a constant width and an undulation not having a constant width along the axial line direction, the adhesion strength between the edge member for membrane elements and the exterior finishing material can be more effectively improved.

The edge member for membrane elements according to the present invention is characterized in that the height difference of the first undulation is larger than the height difference of the second undulation.

According to such a structure, by allowing the height differences of the first undulation and the second undulation to be different from each other, the adhesion strength between the edge member for membrane elements and the exterior finishing material can be further effectively improved. In the case of a structure in which the width along the axial line direction is made different between the first undulation and the second undulation, the adhesion strength between the edge member for membrane elements and the exterior finishing material can be more effectively improved by providing a structure in which the first undulation having a larger width along the axial line direction is allowed to have a larger height difference. In the case of a structure in which the first undulation having a constant width and the second undulation not having a constant width along the axial line direction are provided, the adhesion strength between the edge member for membrane elements and the exterior finishing material can be more effectively improved by providing a structure in which the first undulation having a constant width along the axial line direction is allowed to have a larger height difference.

The edge member for membrane elements according to the present invention is characterized in that a length of the extension along the axial line direction is smaller than or equal to 15 times the height difference of the undulation having the largest height difference among the plurality of types of undulations.

According to such a structure, even in a case in which the length of the extension along the axial line direction is comparatively short, the adhesion strength between the edge member for membrane elements and the exterior finishing material can be effectively improved. That is, when the length of the extension along the axial line direction is short, the contact part between the edge member for membrane elements and the exterior finishing material becomes narrow, whereby the adhesion strength between the edge member for membrane elements and the exterior finishing material decreases; however, by adopting a structure as in the present invention, the adhesion strength can be effectively improved.

It is more preferable that the length of the extension along the axial line direction is smaller than or equal to 9 times the height difference of the undulation having the largest height difference among the plurality of types of undulations.

A membrane element according to the present invention is characterized in that it includes the above-described edge member for membrane elements, a membrane roll body formed by winding a membrane member around, in which the edge member for membrane elements is disposed at an end in an axial line direction thereof, and an exterior finishing material attached to extend across an outer circumference of the extension and an outer circumference of the membrane roll body.

According to such a structure, a membrane element that achieves an effect similar to that of the edge member for membrane elements according to the present invention can be provided.

Effects of the Invention

According to the present invention, the exterior finishing material can be attached to the outer circumference of the extension in a state in which the exterior finishing material is in contact with the plurality of types of undulations, whereby the adhesion strength between the edge member for membrane elements and the exterior finishing material can be effectively improved.

BRIEF DESCRIPTION OF THE DRAWINGS

FIGS. 5(a) and 5(b) are views illustrating a structure of an anti-telescoping member according to Example 2, where FIG. 5(a) shows a partial cross-sectional view, and FIG. 5(b) shows a partial plan view.

FIGS. 7A(a) and 7A(b) are partial cross-sectional views illustrating modified examples of a second undulation.

Figure 1:
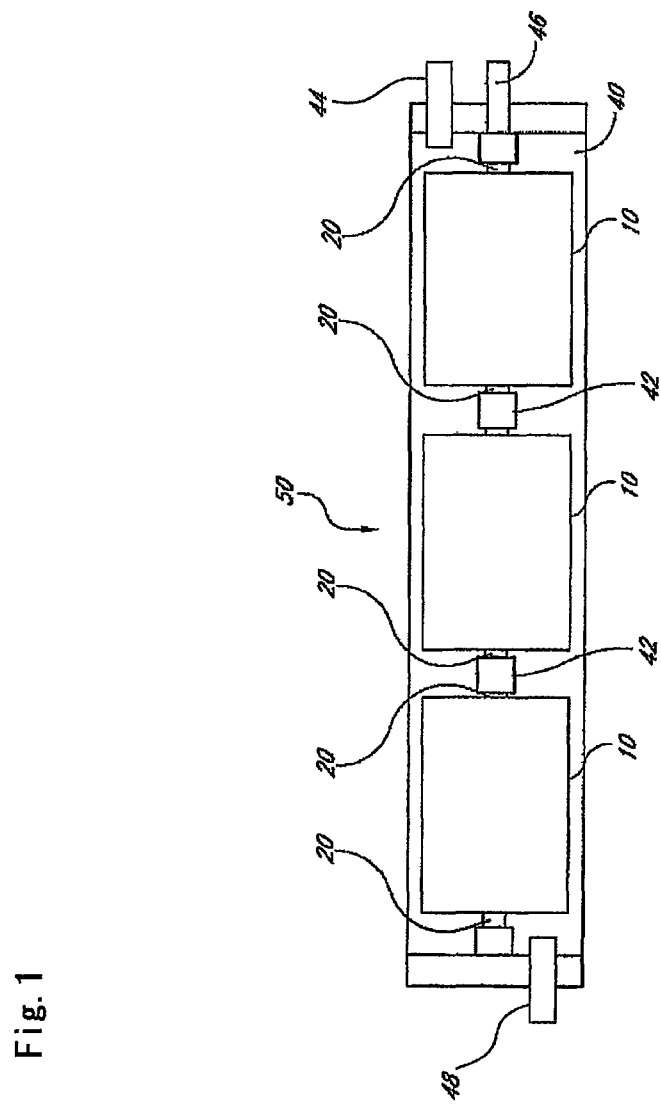
FIG. 1 is a schematic cross-sectional view illustrating one example of a membrane filtration apparatus equipped with a membrane element according to one embodiment of the present invention.

DESCRIPTION OF REFERENCE SYMBOLS 10 membrane element
11 membrane roll body
12 separation membrane
13 anti-telescoping member
14 permeate side passage material
15 exterior finishing material
16 membrane member
18 feed side passage material
20 core tube
40 pressure-resistant vessel
50 membrane filtration apparatus
131 anti-telescoping member
131 main body
132 extension
133 annular recess
134 first undulation
135 second undulation

MODES FOR CARRYING OUT THE INVENTION

Figure 2:
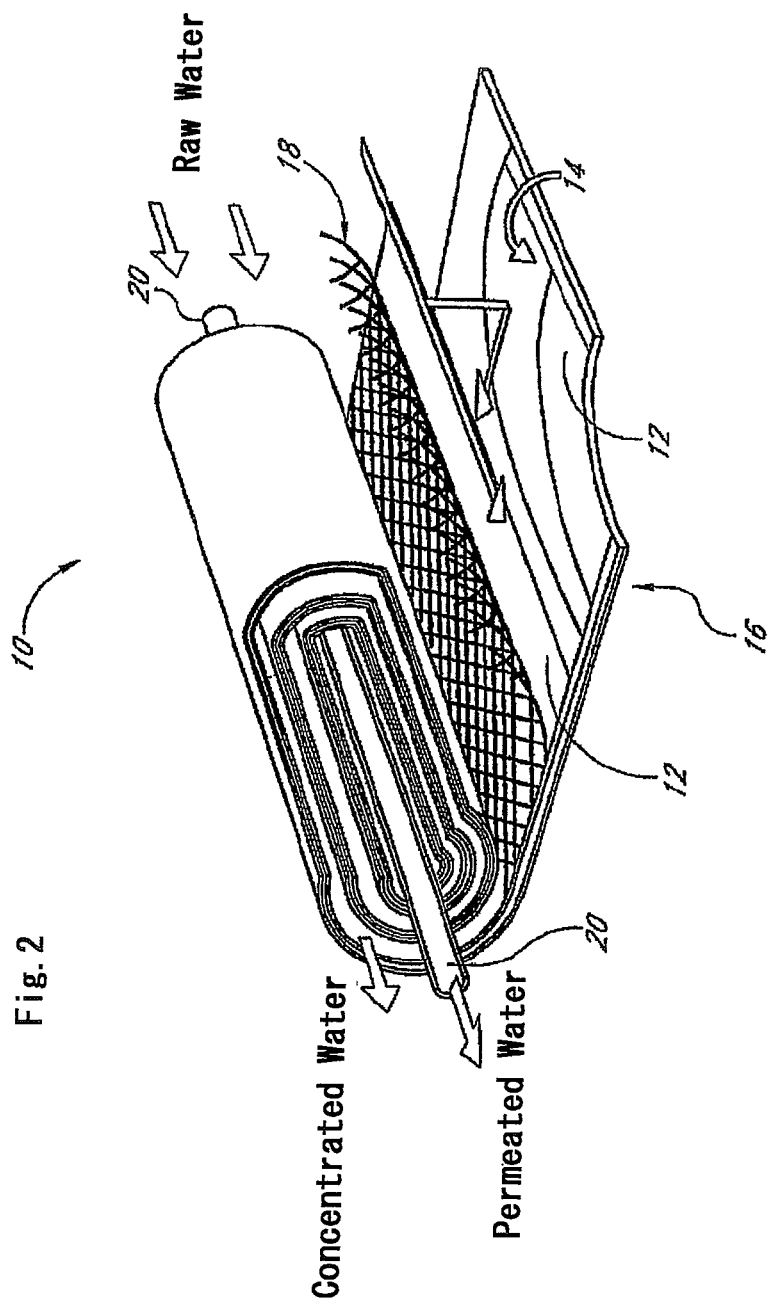
FIG. 2 is a perspective view illustrating an internal structure of the membrane element.

FIG. 1 is a schematic cross-sectional view illustrating one example of a membrane filtration apparatus 50 equipped with a membrane element 10 according to one embodiment of the present invention. FIG. 2 is a perspective view illustrating an internal structure of the membrane element 10. This membrane filtration apparatus 50 is constructed by disposing a plurality of membrane elements 10 in a straight line within a pressure-resistant vessel 40.

The pressure-resistant vessel 40 includes a tubular body made of resin and is formed, for example, of FRP (Fiberglass Reinforced Plastics). Within this pressure-resistant vessel 40, a plurality of membrane elements 10 are disposed side by side along the axial line direction. At one end of the pressure-resistant vessel 40, a raw water flow inlet 48 through which raw water (raw liquid) such as waste water or sea water flows in is formed. By filtration of the raw water that flows in at a predetermined pressure through the raw water flow inlet 48 with a plurality of membrane elements 10, permeated water (permeated liquid) which has been purified and concentrated water (concentrated liquid) which is the raw water after filtration are obtained. At the other end of the pressure-resistant vessel 40, a permeated water flow outlet 46 through which the permeated water flows out and a concentrated water flow outlet 44 through which the concentrated water flows out are formed.

As shown in FIG. 2, the membrane element 10 is an RO (Reverse Osmosis: reverse osmosis membrane) element that is formed by winding a separation membrane 12, a feed side passage material 18, and a permeate side passage material 14 in a laminated state around a core tube 20 in a spiral form.

More specifically, on both surfaces of a permeate side passage material 14 formed by a net-shaped member made of resin and having a rectangular shape, a separation membrane 12 having the same rectangular shape is superposed, and the three sides thereof are bonded, whereby a bag-shaped membrane member 16 having an opening at one side is formed. Then, the opening of this membrane member 16 is attached to an outer circumferential surface of a core tube 20 and is wound around the core tube 20 together with a feed side passage material 18 formed by a net-shaped member made of resin, whereby the membrane element 10 is formed. The separation membrane 12 is formed, for example, by successive lamination of a porous support and a skin layer (dense layer) on a non-woven cloth layer.

When raw water is supplied through one end of the membrane element 10 formed as described above, the raw water passes within the membrane element 10 via a raw water flow path formed by the feed side passage material 18 functioning as a raw water spacer. At that time, the raw water is filtered by the separation membrane 12, and the permeated water that has been filtered from the raw water penetrates into a permeated water flow path formed by the permeate side passage material 14 functioning as a permeated water spacer.

Thereafter, the permeated water that has penetrated into the permeated water flow path passes through the permeated water flow path to flow to the core tube 20 side, and is guided into the core tube 20 through a plurality of water-passing holes (not shown) formed on the outer circumferential surface of the core tube 20. This allows the permeated water to flow out via the core tube 20 from the other end of the membrane element 10, and concentrated water flows out via the raw water flow path formed by the feed side passage material 18.

As shown in FIG. 1, a plurality of membrane elements 10 that are housed within the pressure-resistant vessel 40 are formed in such a manner that the core tubes 20 of adjacent membrane elements 10 are connected with each other by a tubular interconnector 42. This interconnector 42 constitutes an attachment member that can be attached/detached relative to the core tube 20 of the membrane element 10. Therefore, the raw water that has flowed in through the raw water flow inlet 48 flows into the raw water flow path successively from the membrane element 10 on the raw water flow inlet 48 side, and the permeated water that has been filtered from the raw water by each membrane element 10 flows out through the permeated water flow outlet 46 via one core tube 20 connected by the interconnectors 42. On the other hand, the concentrated water that has been concentrated by filtration of the permeated water by passing through the raw water flow path of each membrane element 10 flows out from the concentrated water flow outlet 44.

However, the membrane filtration apparatus 50 is not limited to a structure in which a plurality of membrane elements 10 are housed within the pressure-resistant vessel 40, and a structure in which only one membrane element 10 is housed within the pressure-resistant vessel 40 may be adopted. Moreover, the membrane element 10 is not limited to an RO element, and other various membrane elements such as an MF (Membrane Filter: precision filtration membrane) element or a UF (Ultra Filter: ultrafiltration membrane) element can also be adopted.

Figure 3:
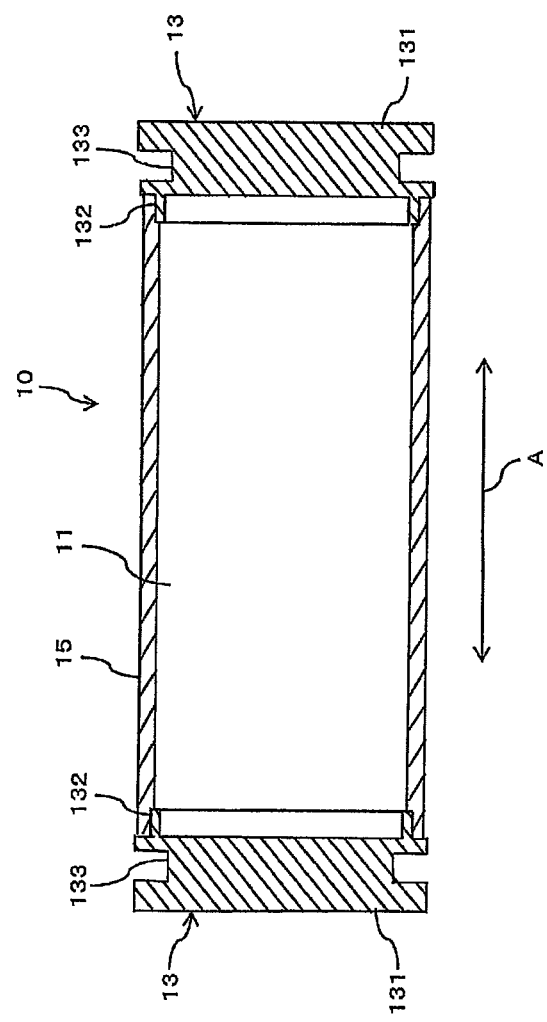
FIG. 3 is a schematic cross-sectional view illustrating the internal structure of the membrane element.

FIG. 3 is a schematic cross-sectional view illustrating an internal structure of the membrane element 10. The membrane member 16 wound in a spiral form in the above-described manner forms a membrane roll body 11 having a tubular shape, and the membrane element 10 is formed by attachment of an anti-telescoping member 13 and an exterior finishing material 15 to the membrane roll body 11.

The anti-telescoping member 13 is an edge member for membrane elements that is disposed at an end of the membrane roll body 11 in an axial line direction A and serves to prevent the membrane member 16 from being shifted in the axial line direction A. In this example, the anti-telescoping member 13 is disposed at both ends of the membrane roll body 11 in the axial line direction A. However, the present invention is not limited to such a structure, and a structure may also be adopted in which the anti-telescoping member 13 is disposed only at one end of the membrane roll body 11.

The anti-telescoping member 13 is constructed by integrally forming a main body 131 that faces an end surface of the membrane roll body 11 and an extension 132 that extends from the main body 131 toward the membrane roll body 11 side along the axial line direction A. A material of the anti-telescoping member 13 may include a resin such as ABS, Noryl, and PVC.

The main body 131 of the anti-telescoping member 13 is formed to have a disk shape having an outer diameter larger than the end surface of the membrane roll body 11. An annular recess 133 for housing and holding a gasket (not shown) is formed on the outer circumferential surface of the main body 131. The membrane element 10 is disposed within the pressure-resistant vessel 40 in a state in which the gasket is mounted within this annular recess 133, whereby the surface of the gasket is in contact with the inner circumferential surface of the pressure-resistant vessel 40. Accordingly, the anti-telescoping member 13 also functions as a seal holding member (seal carrier) that holds the gasket (seal).

The extension 132 of the anti-telescoping member 13 protrudes in an annular shape from the main body 131 toward the membrane roll body 11 side, and the outer diameter of the extension 132 is almost identical to the outer diameter of the membrane roll body 11. Therefore, by disposing the anti-telescoping member 13 so that the main body 131 faces the end surface of the membrane roll body 11, the tip end edge of the annular extension 132 can be brought into contact with the outer circumferential edge of the end surface of the membrane roll body 11. In this state, the exterior finishing material 15 is attached to extend across the outer circumference of the extension 132 and the outer circumference of the membrane roll body 11, thereby a structure is obtained in which the membrane roll body 11 is covered by the anti-telescoping member 13 and the exterior finishing material 15. However, the extension 132 is not limited to a structure of being formed in an annular shape, and a structure may be adopted in which, for example, a plurality of extensions 132 are formed to protrude from the main body 131 toward the membrane roll body 11 side.

The exterior finishing material 15 is, for example, an FRP exterior finishing material made of a glass fiber and an adhesive agent, and is wound around continuously in the circumferential direction along the outer circumferential surface of the membrane roll body 11 from the extension 132 of one anti-telescoping member 131 to the extension 132 of the other anti-telescoping member 131, so as to cover the whole of the outer circumference of the membrane roll body 11.

Example 1

Figure 4:
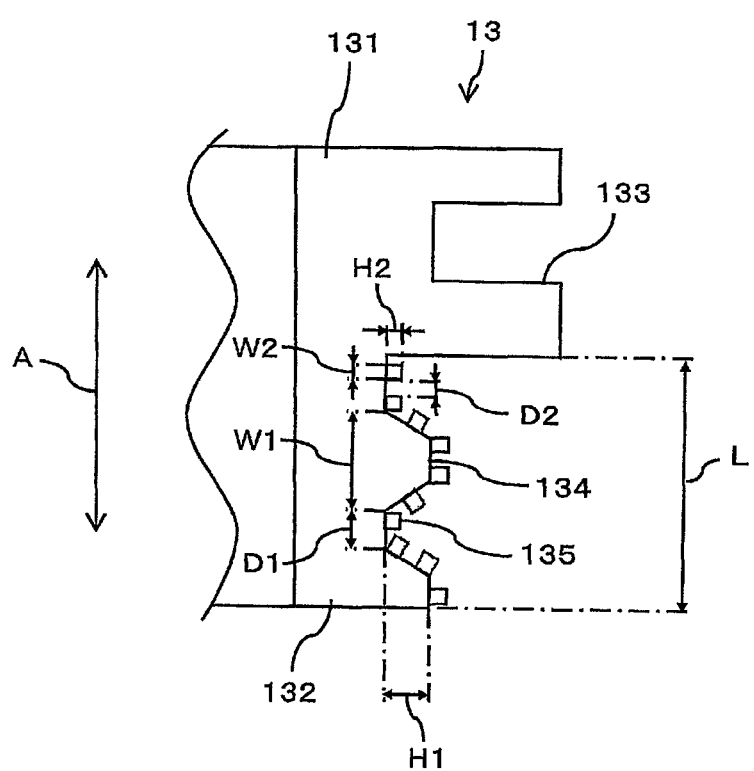
FIG. 4 is a partial cross-sectional view illustrating a structure of an anti-telescoping member according to Example 1.

FIG. 4 is a partial cross-sectional view illustrating a structure of an anti-telescoping member 13 according to Example 1. In this Example 1, a plurality of types of undulations 134, 135 having different shapes from each other are formed on the outer circumferential surface of the extension 132 of the anti-telescoping member 13.

Specifically, first undulations 134 having a constant width W1 in the axial line direction A and second undulations 135 having a constant width W2 smaller than the width W1 in the axial line direction A are formed on the outer circumference of the extension 132. The first undulations 134 and the second undulations 135 are each formed in an annular shape along the circumferential direction perpendicular to the axial line direction A. The width W1 of the first undulations 134 is preferably 0.5 mm to 3.0 mm. The width W2 of the second undulations 135 is preferably 0.1 mm to 0.5 mm. Also, the width W1 of the first undulations 134 is preferably 2 times to 30 times as large as the width W2 of the second undulations 135.

The first undulations 134 and the second undulations 135 are formed respectively at constant intervals along the axial line direction A. An interval D1 of the first undulations 134 along the axial line direction A is different from an interval D2 of the second undulations 135 along the axial line direction A, and the interval D1 of the first undulations 134 is preferably larger than the interval D2 of the second undulations 135. The interval D1 of the first undulations 134 is preferably 0.5 mm to 3.0 mm, and the interval D2 of the second undulations 135 is preferably 0.1 mm to 0.5 mm. Also, the interval D1 of the first undulations 134 is preferably 2 times to 10 times as large as the interval D2 of the second undulations 135.

The first undulations 134 and the second undulations 135 are formed respectively at different height differences. A height difference H1 of the first undulations 134 is preferably larger than a height difference H2 of the second undulations 135. The height difference H1 of the first undulations 134 is preferably 0.5 mm to 5 mm, and the height difference H2 of the second undulations 135 is preferably 0.02 mm to 0.5 mm. Also, the height difference H1 of the first undulations 134 is preferably 2 times to 50 times as large as the height difference H2 of the second undulations 135.

Regarding undulations having a comparatively large height difference such as the first undulations 134, the undulations can be formed on an anti-telescoping member 13 that is molded with use of a mold by providing undulations on the mold by an NC lathe or the like. On the other hand, undulations having a comparatively small height difference such as the second undulations 135 can be formed with use of a method of providing various undulations (patterns) on the mold by the metal fine processing method of forming a pattern on a surface of a metal referred to as a chemical etching (an embossing process) or the like in addition to the method of providing undulations on the mold by an NC lathe or the like as described above.

The undulations can be formed by performing post-processing on a molded article of the anti-telescoping member 13; however, this requires higher processing costs, and it is preferable to adopt a method of providing undulations on the mold. In addition to the cutting process or the embossing process using an NC lathe or the like as described above, the method of providing undulations on the mold may include an electric discharge process, a laser process, a blast process, or the like.

Note that, in this Example 1, an FRP exterior finishing material was used as the exterior finishing material 15 that is attached to the outer circumference of the extension 132 of the anti-telescoping member 13.

In this Example 1, the height difference H1 of the first undulations 134 is 0.8 mm, and the height difference H2 of the second undulations 135 is 0.1 mm. Also, the width W1 of the first undulations 134 is 2.4 mm, and the width W2 of the second undulations 135 is 0.25 mm. Also, the interval D1 of the first undulations 134 is 0.8 mm, and the interval D2 of the second undulations 135 is 0.25 mm.

Also, the length L of the extension 132 along the axial line direction A is 5.6 mm. This length L is set to be 7 times as large as the height difference H1 of the first undulations 134 which are the undulations having the larger height difference. The length L of the extension 132 along the axial line direction A is not limited to such a value as described above; however, the length L is preferably equal to or smaller than 15 times the height difference of the undulations having the largest height difference.

In this Example 1, a structure is shown in which the height differences H1, H2 and the widths W1, W2 along the axial line direction A of the first undulations 134 and the second undulations 135 are all different. However, the present invention is not limited to such a structure, and a structure may be adopted in which either one of the height differences H1, H2 and the widths W1, W2 along the axial line direction A is different. Also, in this Example 1, the protrusions of the first undulations 134 and the second undulations 135 each have a rectangular cross-section. Specifically, the protrusion of the first undulation 134 has a trapezoidal cross-section, and the protrusion of the second undulation 135 has a rectangular or square cross-section; however, the present invention is not limited to such a structure.

Also, in this Example 1, a structure is shown in which the protrusion of the second undulations 135 is formed respectively on the protrusion and on the recess of the first undulations 134. However, the present invention is not limited to such a structure, and a there may be adopted a structure in which the protrusion of the second undulations 135 is formed only on the protrusion of the first undulations 134 or a structure in which the protrusion of the second undulations 135 is formed only on the recess of the first undulations 134. Also, the undulations formed on the outer circumference of the extension 132 is not limited to two types of the first undulations 134 and the second undulations 135, and three or more types of undulations may be provided.

Example 2

FIGS. 5(a) and 5(b) are views illustrating a structure of an anti-telescoping member 13 according to Example 2, where FIG. 5(a) shows a partial cross-sectional view, and FIG. 5(b) shows a partial plan view. In this Example 2, a plurality of types of undulations 134, 135 having different shapes from each other are formed on the outer circumference of the extension 132 of the anti-telescoping member 13.

Specifically, first undulations 134 having a constant width W1 along the axial line direction A and second undulations 135 made of a predetermined pattern that is not formed to have a constant width along the axial line direction A are formed on the outer circumference of the extension 132. The first undulations 134 are formed in an annular shape along the circumferential direction perpendicular to the axial line direction A. The width W1 of the first undulations 134 is preferably 0.5 mm to 3.0 mm.

The first undulations 134 are formed at a constant interval D1 along the axial line direction A. This interval D1 of the first undulations 134 is preferably 0.5 mm to 3.0 mm.

The first undulations 134 and the second undulations 135 are formed respectively at different height differences, and the height difference H1 of the first undulations 134 is preferably larger than the height difference H2 of the second undulations 135. The height difference H1 of the first undulations 134 is preferably 0.5 mm to 5 mm. The height difference H2 of the second undulations 135 is preferably 0.02 mm to 0.5 mm. Also, the height difference H1 of the first undulations 134 is preferably 2 times to 50 times as large as the height difference H2 of the second undulations 135.

As a method of forming the first undulations 134 and the second undulations 135, a method as described in Example 1 can be adopted. Note that, in this Example 2, an FRP exterior finishing material was used as the exterior finishing material 15 that is attached to the outer circumference of the extension 132 of the anti-telescoping member 13.

In this Example 2, the height difference H1 of the first undulations 134 is 0.8 mm, and the height difference H2 of the second undulations 135 is 0.1 mm. Also, the width W1 of the first undulations 134 is 2.4 mm, and the interval D1 of the first undulations 134 is 0.8 mm.

Also, the length L of the extension 132 along the axial line direction A is 5.6 mm. This length L is set to be 7 times as large as the height difference H1 of the first undulations 134 which are the undulations having the larger height difference. The length L of the extension 132 along the axial line direction A is not limited to such a value as described above; however, the length L is preferably equal to or smaller than 15 times the height difference of the undulations having the largest height difference.

In this Example 2, the protrusion of the first undulations 134 has a rectangular cross-section, specifically, a trapezoidal cross-section; however, the present invention is not limited to such a structure. Also, the second undulations 135 are formed in an irregular pattern; however, the present invention is not limited to such a structure, and a structure formed of a pattern having regularity may be adopted.

Also, in this Example 2, a structure is shown in which the protrusion of the second undulations 135 is formed respectively on the protrusion and on the recess of the first undulations 134; however, the present invention is not limited to such a structure, and there may be adopted a structure in which the protrusion of the second undulations 135 is formed only on the protrusion of the first undulations 134 or a structure in which the protrusion of the second undulations 135 is formed only on the recess of the first undulations 134. Also, the undulations formed on the outer circumference of the extension 132 is not limited to two types of the first undulations 134 and the second undulations 135, and three or more types of undulations may be provided.

(Modified Example of First Undulation)

Figure 6A:
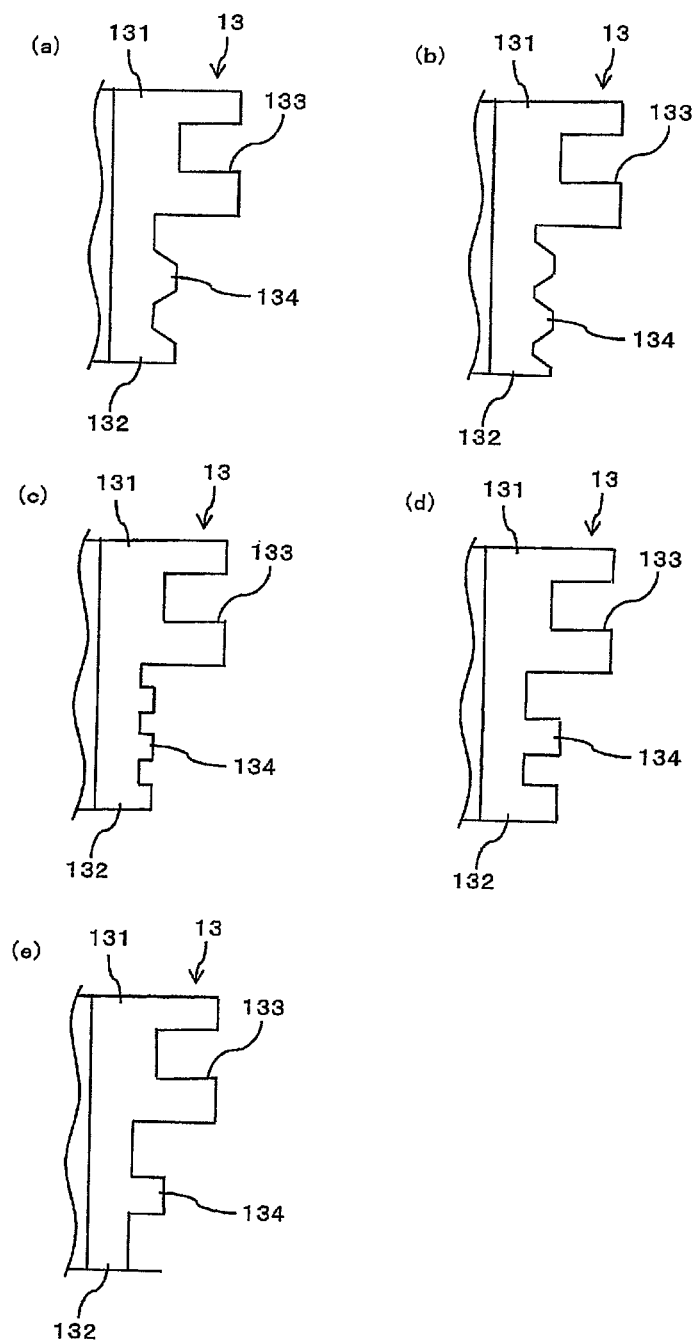
FIGS. 6A(a) to 6A(e) are partial cross-sectional views illustrating modified examples of a first undulation.
Figure 6B:
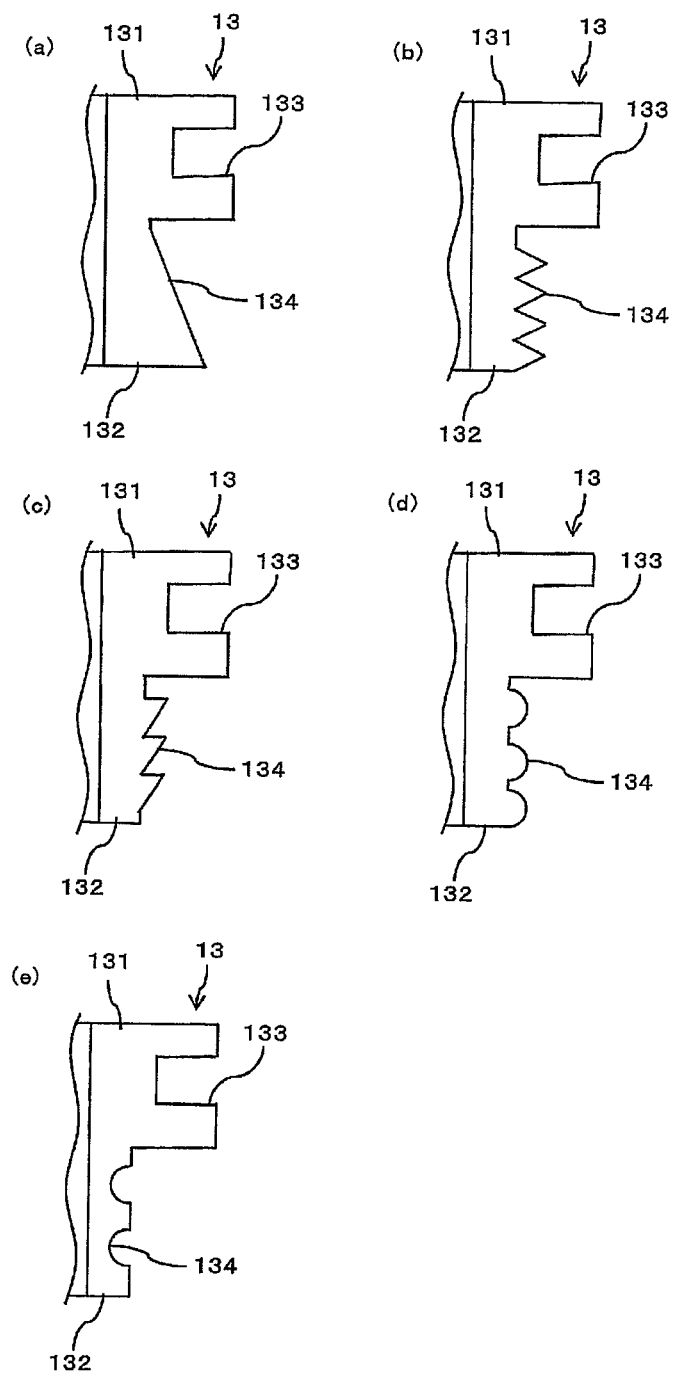
FIGS. 6B(a) to 6B(e) are partial cross-sectional views illustrating modified examples of the first undulation.

FIGS. 6A and 6B are partial cross-sectional views illustrating modified examples of the first undulation 134. Note that, in FIGS. 6A and 6B, only the structure of the first undulation 134 is shown by omitting illustration of the second undulation 135.

FIG. 6A(a) shows a first undulation 134 made of a shape similar to that of Examples 1 and 2, and the protrusion of the first undulation 134 has a trapezoidal cross-section. FIG. 6A(b) shows an example in which the protrusion of the first undulation 134 has a trapezoidal cross-section as in the example of FIG. 6A(a); however, the number of protrusions is different.

FIG. 6A(c) shows an example in which the protrusion of the first undulation 134 has a rectangular cross-section. FIGS. 6A(d) and 6A(e) show examples in which the protrusion of the first undulation 134 has a square cross-section; however, the number of protrusions is different.

FIGS. 6B(a) to 6B(c) show examples in which the protrusion of the first undulation 134 has a triangular cross-section. In the example of FIG. 6B(a), the protrusion of the first undulation 134 has a right-triangular cross-section having a shape such that the height becomes gradually smaller toward the main body 131 side. In the example of FIG. 6B(b), the protrusion of the first undulation 134 has an isosceles-triangular cross-section having a shape such that the central part thereof is the highest. In the example of FIG. 6B(c), the protrusion of the first undulation 134 has a right-triangular cross-section having a shape such that the height becomes gradually larger toward the main body 131 side. The number of these protrusions having a triangular shape can be set to be an arbitrary value.

FIG. 6B(d) shows an example in which the protrusion of the first undulation 134 has a semicircular cross-section. FIG. 6B(e) shows an example in which the recess of the first undulation 134 has a semicircular cross-section. The number of these protrusions or recesses having a semicircular cross-section can be set to be an arbitrary value.

(Modified Example of Second Undulation)

Figure 7B:
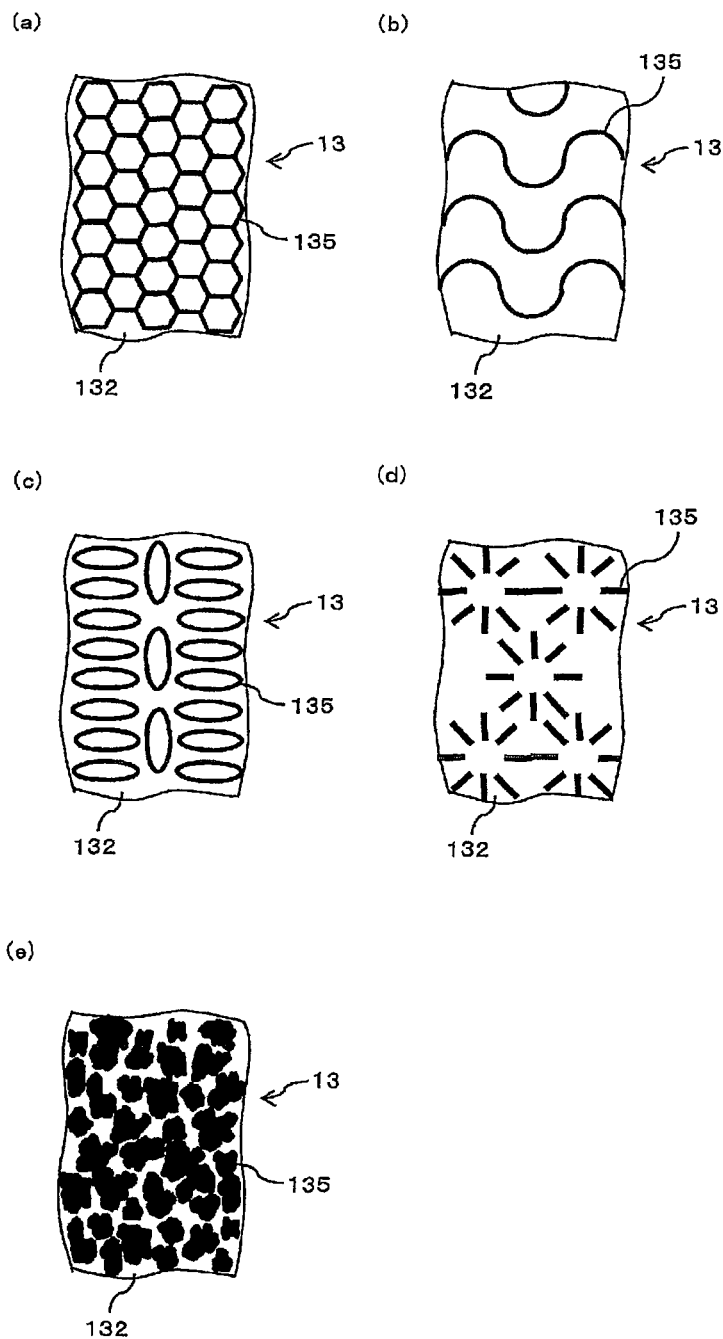
FIG. 7B(a) to 7B(e) are partial cross-sectional views illustrating modified examples of the second undulation.

FIG. 7A is a partial cross-sectional view illustrating modified examples of the second undulation 135. FIG. 7B is a partial plan view illustrating modified examples of the second undulation 135. Note that, in FIGS. 7A and 7B, only the structure of the second undulation 135 is shown by omitting illustration of the first undulation 134.

FIG. 7A(a) shows an example in which the protrusion of the second undulation 135 has a rectangular cross-section. In this example, the protrusion of the second undulation 135 has a square cross-section; however, the present invention is not limited to such a structure, and a structure having a cross-section such as a rectangular shape may be adopted.

FIG. 7A(b) shows an example in which the protrusion of the second undulation 135 has a triangular cross-section. In this example, the protrusion of the second undulation 135 has an isosceles-triangular cross-section; however, the present invention is not limited to such a structure, and there may be adopted a structure having a right-triangular cross-section such that the height becomes gradually smaller toward the main body 131 side or a right-triangular cross-section such that the height becomes gradually larger toward the main body 131 side.

FIG. 7A shows an example in which the second undulation 135 has a constant width along the axial line direction A, whereas FIG. 7B shows an example in which the second undulation 135 is made of a predetermined pattern that is not formed to have a constant width along the axial line direction A.

Specifically, FIG. 7B(a) shows an example of the second undulation 135 made of a pattern in which a plurality of protrusions having a polygonal shape are formed as viewed in a plan view. In this example, a honeycomb-shaped pattern is shown in which a plurality of hexagonal protrusions are formed. However, the present invention is not limited to such a structure, and a structure may be adopted in which protrusions having a polygonal shape other than a hexagonal shape are formed.

FIG. 7B(b) shows an example of the second undulation 135 made of a pattern in which a plurality of protrusions having a circular arc shape are formed as viewed in a plan view. FIG. 7B(c) shows an example of the second undulation 135 made of a pattern in which a plurality of protrusions having an annular shape are formed as viewed in a plan view. In this example of FIG. 7B(c), the protrusions of the second undulation 135 are made of an elliptic shape, and the directions of the longer axis thereof are partially different from each other (for example, perpendicular to each other). However, the present invention is not limited to such a structure, and there may be adopted a structure in which the longer axis extends in a constant direction or a structure in which the protrusions are made of a true circle shape.

FIG. 7B(d) shows an example of the second undulation 135 made of a pattern in which a plurality of protrusions having a straight line shape are formed to extend in numerous directions as viewed in a plan view. This example of FIG. 7B(d) shows a structure in which a plurality of patterns are formed, where, in each of the patterns, straight-line-shaped protrusions extending in numerous directions are arranged in a circular shape; however, the present invention is not limited to such a structure. In above FIGS. 7B(a) to 7B(d), examples have been described in which the second undulation 135 is formed of a pattern having regularity; however, FIG. 7B(e) shows an example in which the second undulation 135 is made of an irregular pattern in the same manner as in Example 2.

In the present embodiment, a plurality of types of undulations 134, 135 having different shapes from each other are formed on the outer circumference of the extension 132 that extends from the main body 131 of the anti-telescoping member 13 toward the membrane roll body 11, and the exterior finishing material 15 is attached to extend across the outer circumference of this extension 132 and the outer circumference of the membrane roll body 11. This allows the exterior finishing material 15 to be attached to the outer circumference of the extension 132 in a state in which the exterior finishing material 15 is in contact with the plurality of types of undulations 134, 135, whereby the adhesion strength between the anti-telescoping member 13 and the exterior finishing material 15 can be effectively improved.

(Peeling Strength Experiment)

In the following, a result of a peeling strength experiment that was carried out to confirm the effect achieved by the structure of the present invention as shown above will be described. This peeling strength experiment was carried out by using anti-telescoping members 13 according to Comparative Examples 1 to 3 and Reference Example as described below in addition to the anti-telescoping members 13 according to Examples 1 and 2 described above. First, a specific structure of the anti-telescoping members 13 according to Comparative Examples 1 to 3 and Reference Example will be described.

Comparative Example 1

Figure 8:
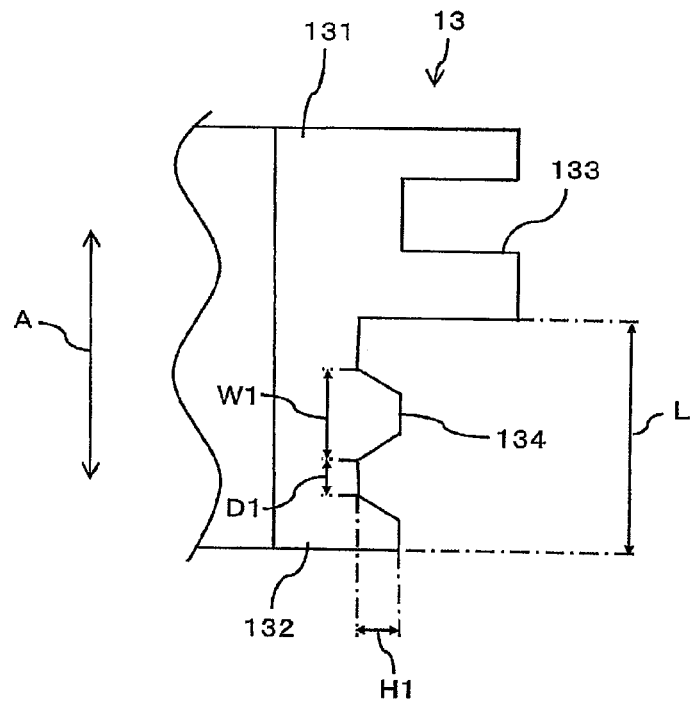
FIG. 8 is a partial cross-sectional view illustrating a structure of an anti-telescoping member according to Comparative Example 1.

FIG. 8 is a partial cross-sectional view illustrating a structure of an anti-telescoping member 13 according to Comparative Example 1. In this Comparative Example 1, only the first undulations 134 having a comparatively large height difference H1 are formed on the outer circumference of the extension 132 of the anti-telescoping member 13.

Specifically, first undulations 134 having a constant width W1 along the axial line direction A are formed on the outer circumference of the extension 132. The first undulations 134 are formed in an annular shape along the circumferential direction perpendicular to the axial line direction A. The protrusions of the first undulations 134 have a trapezoidal cross-section.

The width W1 of the first undulations 134 is 2.4 mm. The first undulations 134 are formed at a constant interval D1 in the axial line direction A, and the interval D1 is 0.8 mm. The height difference H1 of the first undulations 134 is 0.8 mm. The length L of the extension 132 in the axial line direction A is 5.6 mm, and this length L is set to be 7 times as large as the height difference H1 of the first undulations 134. Note that, in this Comparative Example 1, an FRP exterior finishing material was used as the exterior finishing material 15 that is attached to the outer circumference of the extension 132 of the anti-telescoping member 13.

Comparative Example 2

Figure 9:
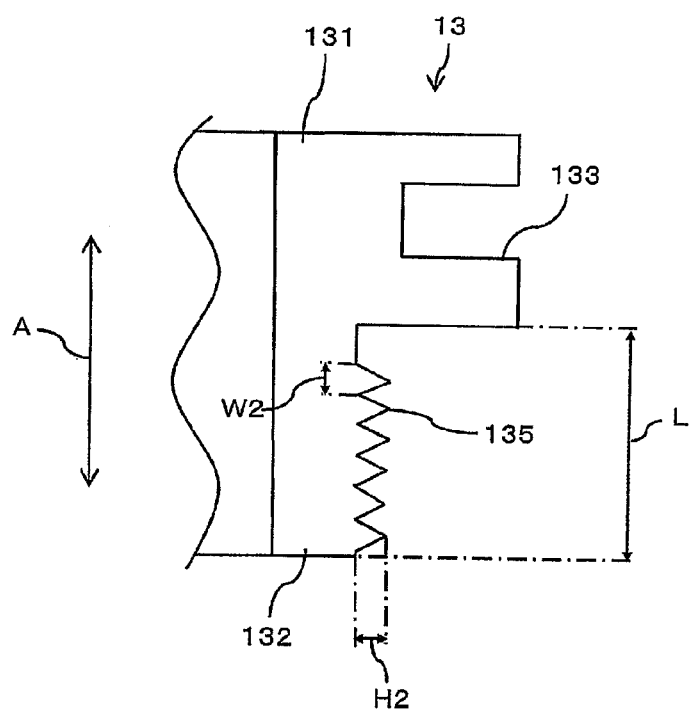
FIG. 9 is a partial cross-sectional view illustrating a structure of an anti-telescoping member according to Comparative Example 2.

FIG. 9 is a partial cross-sectional view illustrating a structure of an anti-telescoping member 13 according to Comparative Example 2. In this Comparative Example 2, only the second undulations 135 having a comparatively small height difference H2 are formed on the outer circumference of the extension 132 of the anti-telescoping member 13.

Specifically, second undulations 135 having a constant width W2 along the axial line direction A are formed on the outer circumference of the extension 132. The second undulations 135 are formed in an annular shape along the circumferential direction perpendicular to the axial line direction A. The protrusions of the second undulations 135 have an isosceles-triangular cross-section.

The width W2 of the second undulations 135 is 0.7 mm. The second undulations 135 are formed without an interval in the axial line direction A. The height difference H2 of the second undulations 135 is 0.4 mm. The length L of the extension 132 in the axial line direction A is 5.6 mm. Note that, in this Comparative Example 2, an FRP exterior finishing material was used as the exterior finishing material 15 that is attached to the outer circumference of the extension 132 of the anti-telescoping member 13.

Comparative Example 3

Figure 10:
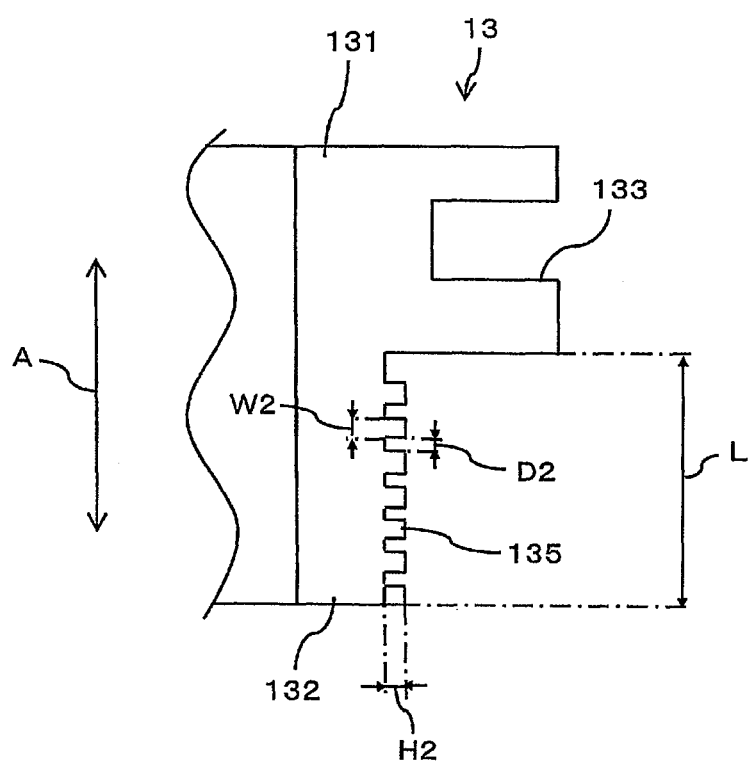
FIG. 10 is a partial cross-sectional view illustrating a structure of an anti-telescoping member according to Comparative Example 3.

FIG. 10 is a partial cross-sectional view illustrating a structure of an anti-telescoping member 13 according to Comparative Example 3. In this Comparative Example 3, only the second undulations 135 having a comparatively small height difference H2 are formed on the outer circumference of the extension 132 of the anti-telescoping member 13.

Specifically, the second undulations 135 having a constant width W2 along the axial line direction A are formed on the outer circumference of the extension 132. The second undulations 135 are formed in an annular shape along the circumferential direction perpendicular to the axial line direction A. The protrusions of the second undulations 135 have a rectangular cross-section.

The width W2 of the second undulations 135 is 0.25 mm. The second undulations 135 are formed at a constant interval D2 in the axial line direction A, and the interval D2 is 0.25 mm. The height difference H2 of the second undulations 135 is 0.1 mm. The length L of the extension 132 in the axial line direction A is 5.6 mm. Note that, in this Comparative Example 3, an FRP exterior finishing material was used as the exterior finishing material 15 that is attached to the outer circumference of the extension 132 of the anti-telescoping member 13.

Reference Example

Figure 11:
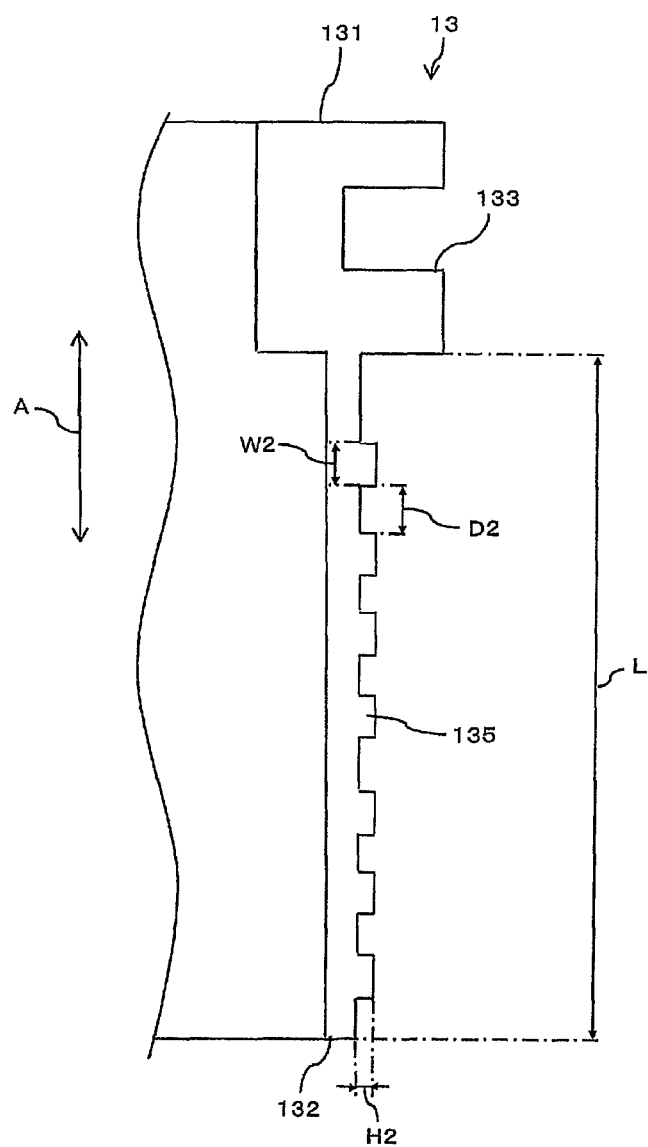
FIG. 11 is a partial cross-sectional view illustrating a structure of an anti-telescoping member according to Reference Example.

FIG. 11 is a partial cross-sectional view illustrating a structure of an anti-telescoping member 13 according to Reference Example. In this Reference Example, the extension 132 of the anti-telescoping member 13 is formed in a skirt shape having a comparatively large length L in the axial line direction A thereof, and the anti-telescoping member 13 is attached to the membrane roll body 11 so that the extension 132 faces the outer circumference of the membrane roll body 11. Only the second undulations 135 having a comparatively smaller height difference H2 are formed on the outer circumference of this extension 132.

Specifically, second undulations 135 having a constant width W2 along the axial line direction A are formed on the outer circumference of the extension 132. The second undulations 135 are formed in an annular shape along the circumferential direction perpendicular to the axial line direction A. The protrusions of the second undulations 135 have a rectangular cross-section.

The width W2 of the second undulations 135 is 1.5 mm. The second undulations 135 are formed at a constant interval D2 in the axial line direction A, and the interval D2 is 1.7 mm. The height difference H2 of the second undulations 135 is 0.4 mm. The length L of the extension 132 in the axial line direction A is 28.5 mm, and this length L is set to be about 5 times as large as the length of the extension 132 in Examples 1 to 2 and Comparative Examples 1 to 3. Note that, in this Reference Example, an FRP exterior finishing material was used as the exterior finishing material 15 that is attached to the outer circumference of the extension 132 of the anti-telescoping member 13.

With respect to each of the membrane elements 10 formed by using the anti-telescoping members 13 according to Examples 1 and 2, Comparative Examples 1 to 3, and Reference Example as described above, a jig was attached within an annular recess 133 of each of the anti-telescoping members 13 disposed at both ends thereof. A peeling strength experiment was carried out by fixing one jig and pulling the other jig. At that time, a tensile strength (kgf) was monitored by a sensor, and the strength at which the anti-telescoping member 13 was detached from the exterior finishing material 15 was measured.

The results of the peeling strength experiment carried out in the above manner are as shown in the following Table 1.

TABLE 1

|  | Tensile Strength (kgf) |
|---|---|
| Example 1 | 1340 |
| Example 2 | 1170 |
| Comparative Example 1 | 780 |
| Comparative Example 2 | 552 |
| Comparative Example 3 | 326 |
| Reference Example | 1310 |

As is apparent from Table 1, by adopting a structure as in Examples 1 and 2, the adhesion strength between the anti-telescoping member 13 and the exterior finishing material 15 can be effectively improved as compared with Comparative Examples 1 to 3.

Also, by adopting a structure as in Examples 1 and 2, it is possible to obtain an adhesion strength of the same degree as in the case of Reference Example using an anti-telescoping member 13 whose extension 132 is formed in a skirt shape. That is, when the length of the extension 132 in the axial line direction A is short, the contact part between the anti-telescoping member 13 and the exterior finishing material 15 becomes narrow, whereby the adhesion strength between the anti-telescoping member 13 and the exterior finishing material 15 decreases; however, by adopting a structure as in Examples 1 and 2, the adhesion strength thereof can be effectively improved.

The invention claimed is:

1. An edge member for membrane elements that is disposed at an end in an axial line direction of a membrane roll body formed by winding a membrane member around and serves to prevent the membrane member from being shifted along the axial line direction, comprising:
a main body that faces an end surface of the membrane roll body; and
an extension that extends from the main body toward the membrane roll body along the axial line direction, wherein
a plurality of types of undulations having different shapes from each other are formed on an outer circumference of the extension, wherein the plurality of types of undulations include a first undulation and a second undulation, and wherein the second undulation is formed on the first undulation, and
an exterior finishing material is attached to extend across the outer circumference of the extension and an outer circumference of the membrane roll body.

2. The edge member for membrane elements according to claim 1, wherein the plurality of types of undulations are different from each other in at least one of a height difference and a width along the axial line direction.

3. The edge member for membrane elements according to claim 1, wherein the first undulation has a constant width along the axial line direction and the second undulation has a width smaller than the constant width along the axial line direction.

4. The edge member for membrane elements according to claim 1, wherein the first undulation has a constant width along the axial line direction and the second undulation is made of a predetermined pattern that is not formed to have a constant width along the axial line direction.

5. The edge member for membrane elements according to claim 3, wherein a height difference of the first undulation is larger than a height difference of the second undulation.

6. The edge member for membrane elements according to claim 4, wherein a height difference of the first undulation is larger than a height difference of the second undulation.

7. The edge member for membrane elements according to claim 1, wherein a length of the extension along the axial line direction is smaller than or equal to 15 times a height difference of the undulation having a largest height difference among the plurality of types of undulations.

8. A membrane element comprising:
an edge member for membrane elements according to claim 1;
a membrane roll body formed by winding a membrane member around, in which the edge member for membrane elements is disposed at an end in an axial line direction thereof; and
an exterior finishing material attached to extend across an outer circumference of the extension and an outer circumference of the membrane roll body.

9. A membrane element comprising:
an edge member for membrane elements according to claim 2;
a membrane roll body formed by winding a membrane member around, in which the edge member for membrane elements is disposed at an end in an axial line direction thereof; and
an exterior finishing material attached to extend across an outer circumference of the extension and an outer circumference of the membrane roll body.

10. A membrane element comprising:
an edge member for membrane elements according to claim 3;
a membrane roll body formed by winding a membrane member around, in which the edge member for membrane elements is disposed at an end in an axial line direction thereof; and
an exterior finishing material attached to extend across an outer circumference of the extension and an outer circumference of the membrane roll body.

11. A membrane element comprising:
an edge member for membrane elements according to claim 4;
a membrane roll body formed by winding a membrane member around, in which the edge member for membrane elements is disposed at an end in an axial line direction thereof; and
an exterior finishing material attached to extend across an outer circumference of the extension and an outer circumference of the membrane roll body.

12. A membrane element comprising:
an edge member for membrane elements according to claim 5;
a membrane roll body formed by winding a membrane member around, in which the edge member for membrane elements is disposed at an end in an axial line direction thereof; and
an exterior finishing material attached to extend across an outer circumference of the extension and an outer circumference of the membrane roll body.

13. A membrane element comprising:
an edge member for membrane elements according to claim 6;
a membrane roll body formed by winding a membrane member around, in which the edge member for membrane elements is disposed at an end in an axial line direction thereof; and
an exterior finishing material attached to extend across an outer circumference of the extension and an outer circumference of the membrane roll body.

14. A membrane element comprising:
an edge member for membrane elements according to claim 7;
a membrane roll body formed by winding a membrane member around, in which the edge member for membrane elements is disposed at an end in an axial line direction thereof; and
an exterior finishing material attached to extend across an outer circumference of the extension and an outer circumference of the membrane roll body.

* * * * *